US012693146B2

(12) United States Patent
Deng et al.

(10) Patent No.: US 12,693,146 B2
(45) Date of Patent: Jul. 28, 2026

(54) MULTIPHASE FLOW METERING SYSTEM AND METHOD

(71) Applicant: PETROCHINA COMPANY LIMITED, Beijing (CN)

(72) Inventors: Feng Deng, Beijing (CN); Guanhong Chen, Beijing (CN); Shiwen Chen, Beijing (CN); Junfeng Shi, Beijing (CN); Mengying Wang, Beijing (CN); Ruidong Zhao, Beijing (CN); Xishun Zhang, Beijing (CN); Chunming Xiong, Beijing (CN); Qun Lei, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 162 days.

(21) Appl. No.: 18/724,757

(22) PCT Filed: Dec. 5, 2022

(86) PCT No.: PCT/CN2022/136634
§ 371 (c)(1),
(2) Date: Jun. 27, 2024

(87) PCT Pub. No.: WO2023/124809
PCT Pub. Date: Jul. 6, 2023

(65) Prior Publication Data
US 2025/0102339 A1 Mar. 27, 2025

(30) Foreign Application Priority Data
Dec. 31, 2021 (CN) .......................... 202111665702.8

(51) Int. Cl.
*G01F 1/74* (2006.01)
*G01F 1/66* (2022.01)
*G01F 1/716* (2006.01)

(52) U.S. Cl.
CPC .................. *G01F 1/74* (2013.01); *G01F 1/66* (2013.01); *G01F 1/716* (2013.01)

(58) Field of Classification Search
CPC .............. G01F 1/66; G01F 1/716; G01F 1/74
See application file for complete search history.

(56) References Cited

U.S. PATENT DOCUMENTS 4,638,251 A 1/1987 King
6,046,587 A * 4/2000 King ........................ G01V 3/14
324/309

(Continued)

FOREIGN PATENT DOCUMENTS

CN 1591042 A 3/2005
CN 105849509 A 8/2016

(Continued)

OTHER PUBLICATIONS

Extended European Search Report issued on Jan. 31, 2025 for European Patent Application No. 22914064.5.

*Primary Examiner* — Gregory H Curran
(74) *Attorney, Agent, or Firm* — Volpe Koenig

(57) ABSTRACT

A multiphase flow metering system, comprising a magnetic resonance multiphase flowmeter and a manifold system, comprising a plurality of control valves and a connection pipeline, for controlling a fluid to flow through the magnetic resonance multiphase flowmeter; and the magnetic resonance multiphase flowmeter comprising a plurality of magnet structures, distributed at intervals in an axial direction and are configured to magnetize a fluid, and further comprises two measurement antennas, distributed at intervals in the axial direction and are configured to perform phase state detection on the magnetized fluid. A multiphase flow metering method is implemented with the multiphase flow metering system, and comprises: measuring a phase state parameter of a fluid, the phase state parameter being a content or (Continued)

speed parameter of a target phase state; collecting reflected signals of the fluid using two measurement antennas; and reading the phase state parameter of the fluid according to collected reflected signals.

12 Claims, 2 Drawing Sheets

(56)                    References Cited

U.S. PATENT DOCUMENTS

| | | | | |
|---|---|---|---|---|
| 9,429,457 | B2 * | 8/2016 | Bousché | ................ G01F 25/10 |
| 9,541,435 | B2 | 1/2017 | Pors et al. | |
| 11,906,606 | B2 * | 2/2024 | Hiltunen | ............. G01R 33/307 |
| 2005/0140368 | A1 | 6/2005 | Freedman | |
| 2006/0020403 | A1 | 1/2006 | Pusiol | |
| 2019/0086249 | A1 | 3/2019 | Deng et al. | |

FOREIGN PATENT DOCUMENTS

| | | | |
|---|---|---|---|
| CN | 107525553 | A | 12/2017 |
| CN | 108254588 | A | 7/2018 |
| CN | 108680212 | A | 10/2018 |
| CN | 108918573 | A | 11/2018 |
| CN | 109115821 | A | 1/2019 |
| CN | 109856175 | A | 6/2019 |
| CN | 112577559 | A | 3/2021 |
| WO | 2015088888 | A1 | 6/2015 |

* cited by examiner

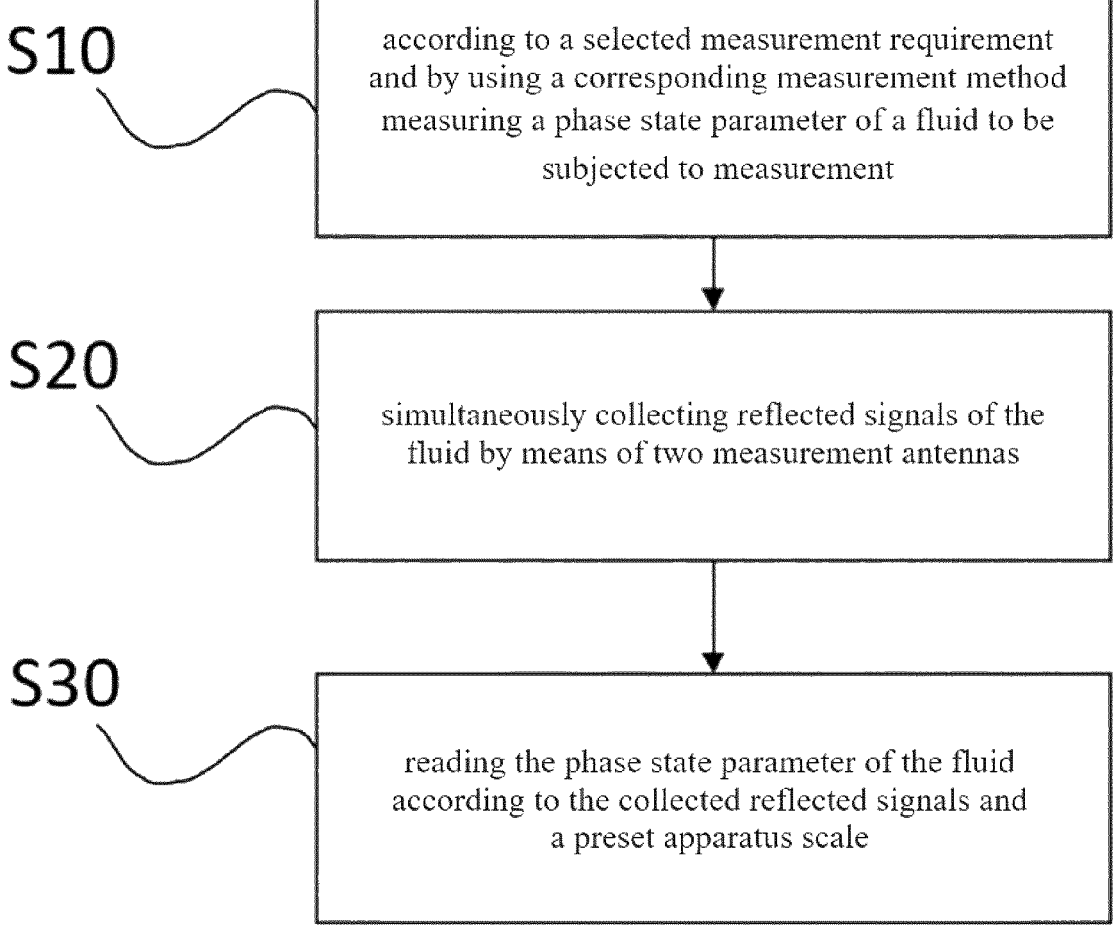

S10 according to a selected measurement requirement and by using a corresponding measurement method measuring a phase state parameter of a fluid to be subjected to measurement

S20 simultaneously collecting reflected signals of the fluid by means of two measurement antennas

S30 reading the phase state parameter of the fluid according to the collected reflected signals and a preset apparatus scale

FIG. 3

MULTIPHASE FLOW METERING SYSTEM AND METHOD

FIELD OF THE INVENTION

The present invention relates to the technical field of oil and gas testing, in particular to a multiphase flow metering system and a multiphase flow metering method.

BACKGROUND OF THE INVENTION

Oil and gas testing is an important process for exploring industrial oil and gas flows, clarifying the characteristics of oil and gas reservoirs, verifying the correctness of reservoir understanding and interpretation, evaluating the development value of oil reservoirs, and determining the mining working system. It is also the first step to directly test the oil and gas bearing strata. Multiphase flowmeters can replace traditional test separators for exploration and oil testing, greatly simplifying the equipment and processes for exploration and oil testing, reducing testing time, significantly saving investment, lowering operating costs, shortening the construction cycle of oil fields, improving reservoir evaluation, and enhancing reservoir management. Because of the large flow rate, high pressure, and the complexity of fluid flow states and components, oil and gas testing measurement differs significantly from production measurement. Given the unique characteristics of oil and gas testing measurement, there is currently no method available for accurately measuring oil and gas testing using multiphase flow. Therefore, a new method for multiphase flow measurement needs to be created.

SUMMARY OF THE INVENTION

The object of the embodiment of the invention is to provide a multiphase flow measurement method and a system, so as to at least solve the problem that the oil and gas testing measurement cannot be accurately carried out at present.

In order to achieve the above object, a first aspect of the invention provides a multiphase flow metering system, including: a magnetic resonance multiphase flowmeter and a manifold system, which is correspondingly configured; the manifold system includes a plurality of control valves and a connection pipeline and is configured to control a corresponding fluid to flow through the magnetic resonance multiphase flowmeter; the manifold system includes: a measurement trunk and a measurement branch; the measurement trunk is formed by connecting the following components in sequence: a first three-way valve, a two-way valve, a second three-way valve and a third three-way valve; and the magnetic resonance multiphase flowmeter is disposed between the two-way valve and the second three-way valve; the measurement branch includes: a fourth three-way valve and a pressure-limiting safety valve; and the measurement branch is connected in parallel on the measurement trunk through a third port of the first three-way valve, a third port of the second three-way valve and a third port of the third three-way valve. The magnetic resonance multiphase flowmeter includes a plurality of magnet structures, which are distributed at intervals in an axial direction of the magnetic resonance multiphase flowmeter and are configured to magnetize a fluid; and the magnetic resonance multiphase flowmeter further includes two measurement antennas, which are distributed at intervals in the axial direction of the magnetic resonance multiphase flowmeter and are configured to perform phase state detection on the magnetized fluid.

Further, the opening and closing states of the first three-way valve, the second three-way valve, the third three-way valve and the fourth three-way valve are determined by the detection state of the fluid; wherein, if the fluid is detected to be in a flow state: the first three-way valve, the third three-way valve and the fourth three-way valve are in a three-way state; the second three-way valve is in a horizontal two-way state; the two-way valve is in an open state; the pressure-limiting safety valve is in a closed state; if the fluid is detected to be in a static state: the first three-way valve, the third three-way valve and the fourth three-way valve are in a three-way state; the second three-way valve is in a state that a liquid outlet end connected to the magnetic resonance multiphase flowmeter is closed, and the remaining two ends are in an open state; and the two-way valve is in a closed state; the pressure-limiting safety valve is in a state to be activated; wherein an activation condition of the pressure-limiting safety valve is that the pressure inside the connection pipeline is greater than a preset threshold value.

Further, a rear half in the axial direction of the magnetic resonance multiphase flowmeter is used as a probing section and a front half in the axial direction of the magnetic resonance multiphase flowmeter is used as a polarizing section; and the multiphase flow metering system further includes: two measurement antennas; both measurement antennas are located in the probing section of the magnetic resonance multiphase flowmeter.

Further, the magnet structures are ring magnet structures or Halbach magnet structures; the magnet structures located in the polarizing section of the magnetic resonance multiphase flowmeter are arranged in contact connection; and the magnet structures located in the probing section of the magnetic resonance multiphase flowmeter are arranged at equal intervals.

A second aspect of the invention provides a multiphase flow metering method implemented on the basis of the multiphase flow metering system described above, the method including: according to a selected measurement requirement and by using a corresponding measurement method measuring a phase state parameter of a fluid; wherein the phase state parameter is a content or speed parameter of a target phase state; simultaneously collecting reflected signals of the fluid by means of two measurement antennas; and reading the phase state parameter of the fluid according to the collected reflected signals and a preset apparatus scale.

Further, the measurement method includes: a water cut measurement method, a gas phase measurement method and a flow velocity measurement method.

Further, the water cut measurement method includes: collecting echo trains of Carr-Purcell-Meiboom-Gill (CPMG) pulse sequences transmitted by two measurement antennas at the same time; respectively fitting the echo trains of the two measurement antennas to obtain corresponding fitted curves; respectively extracting amplitudes of the two fitted curves at a preset moment; and according to the ratio of the amplitudes of the two fitted curves at the same moment, obtaining the water cut and oil cut of the current fluid.

Further, the preset apparatus scale includes: a hydrogen index scale of oil, a hydrogen index scale of natural gas, a length scale of two measurement antennas, an effective area length scale of magnet structures on front ends of the two measurement antennas.

Further, the method further includes: constructing a preset apparatus scale, including constructing a hydrogen index of oil and constructing a hydrogen index scale of natural gas; wherein, constructing the hydrogen index of the oil, including: collecting a fluid sample, obtaining the water cut and oil cut of the fluid sample, obtaining a hydrogen index scale for oil of the fluid sample from the water cut and the oil cut of the fluid sample; and constructing the hydrogen index scale of the natural gas, including: measuring the water cut and the oil cut of the fluid sample at different temperature pressures, obtaining the hydrogen index scale of the natural gas of the sample to be subjected to measurement according to the water cut and the oil cut of the fluid sample at different temperature pressures; or filling the magnetic resonance multiphase flowmeter with a fluid sample and water respectively, obtaining a measured first amplitude of the fluid sample and a measured first amplitude of the water under the condition that the fluid is in a static state, and obtaining a hydrogen index scale of the natural gas based on a ratio of the two.

Further, the gas phase measurement method includes: acquiring a first amplitude of a multiphase flow signal collected by any one of the measurement antennas; obtaining a gas phase content ratio according to the first amplitude of the multiphase flow signal and a preset conversion relationship of the first amplitude of the signal to the gas phase content ratio, the conversion relationship being:

$$R_{gas} + R_{liquid} = 1$$

$$M_{mix} = R_{gas} * M_{gas} + R_{liquid} * M_{liquid}$$

$$M_{liquid} = R_{water} * M_{water} + R_{oil} * M_{oil} =$$

$$R_{water} * M_{water} + (1 - R_{water}) * M_{water} * HI_{oil}$$

wherein, $M_{mix}$ is the measured first amplitude of the multiphase flow signal; $R_{gas}$ is the gas phase content ratio; $M_{gas}$ is the first amplitude of the multiphase flow signal marked by the hydrogen index scale of the natural gas; $R_{liquid} = R_{water} + R_{oil}$, is the content ratio of the liquid phase; $M_{liquid}$ is the first amplitude of the signal when the connection pipeline is filled with the liquid-phase fluid of the current oil-water ratio; $M_{water}$ is the first amplitude of the signal when the connection pipeline is filled with the oil; $HI_{oil}$ is the hydrogen index scale of the oil; and obtaining a gas volume fraction at a standard operating condition according to the gas phase content ratio, and taking the obtained gas volume fraction as a gas phase measurement result.

Further, prior to performing the flow rate measurement method, the method further includes: performing superposition of echo train data measured by two measurement antennas, including: extracting the echo train data measured by the two measurement antennas; wherein the CPMG pulse sequences applied by the two measurement antennas are identical in number of pulses and echo spacing, and the phase difference being 180°; and multiplying all the echo train data of one of the measurement antennas by a wavenumber of the echo to obtain processed echo train data for the measurement antenna, accumulating the processed echo train data for the measurement antenna with the echo train data for the other measurement antenna, and performing a flow rate measurement of the fluid based on the accumulated echo train data.

A third aspect of the present invention provides a computer readable storage medium having stored thereon instructions which, when run on a computer, cause the computer to perform the multiphase flow metering method described above.

Through the technical solutions provided by the present invention, the present invention has at least the following technical effects:

The present solution creates a new multiphase flow metering system for phase detection of fluids using magnetic resonance techniques, the magnetization effect of the fluid is intensified by the preset magnet structure, and then the echo trains of the CPMG pulse sequences are simultaneously transmitted by two measurement antennas distributed at intervals, and the phase detection is performed based on the echo trains, thus improving the detection precision.

Other features and advantages of the present invention will be described in detail in the Detailed Description section that follows.

BRIEF DESCRIPTION OF DRAWINGS

The accompanying drawings are included to provide a further understanding of the embodiments of the invention and constitute a part of this specification and together with the detailed description below serve to explain the embodiments of the invention, but are not to be construed as limiting the embodiments of the invention. In the drawings:

FIG. 3 is a flowchart of the steps of a multiphase flow metering method according to an embodiment of the present invention.

DESCRIPTION OF REFERENCE NUMERALS

Figure 1:
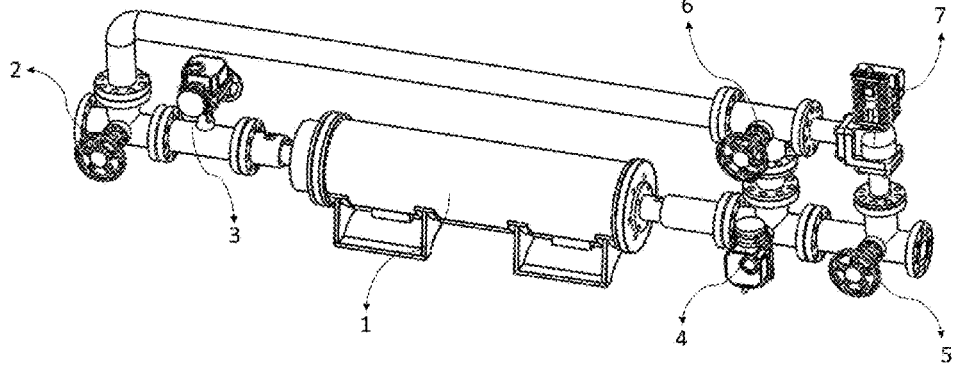
FIG. 1 is a system structural diagram of a multiphase flow metering system according to an embodiment of the present invention.

1—magnetic resonance multiphase flowmeter; 2—first three-way valve; 3—two-way valve; 4—second three-way valve; 5—third three-way valve; 6—fourth three-way valve; 7—pressure-limiting safety valve.

DETAILED DESCRIPTION OF THE EMBODIMENTS

Oil and gas testing is an important process for exploring industrial oil and gas flows, clarifying the characteristics of oil and gas reservoirs, verifying the correctness of reservoir understanding and interpretation, evaluating the development value of oil reservoirs, and determining the mining working system. It is also the first step to directly test the oil and gas bearing strata. Multiphase flowmeters can replace traditional test separators for exploration and oil testing, greatly simplifying the equipment and processes for exploration and oil testing, reducing testing time, significantly saving investment, lowering operating costs, shortening the construction cycle of oil fields, improving reservoir evaluation, and enhancing reservoir management. Multiphase flow metering is an important process throughout the entire oil and gas testing construction, with the aim of understanding in real-time the changes in the flow rate and components of the multiphase flow in the well during the oil and gas testing stage, and thereby understanding the real-time effects of Enhanced Oil Recovery (EOR) measures. Currently, the metering method used at the wellhead involves a "three-phase separator tank+single-phase flowmeter" mode, which has prominent problems such as large equipment size, high investment, low accuracy, data delay, incomplete separation, and the impact of production enhancement measures on measurement accuracy. To address these problems, it is proposed to apply magnetic resonance technology to the metering and assaying of the multiphase flow produced underground during the oil and gas testing stage, aiming to achieve real-time, high-precision, high-frequency, full-range, and environmentally friendly metering of the multiphase flow.

The most prominent characteristics of oil and gas testing measurement, which distinguish it from production measurement, are the large flow rate, high pressure, and the complexity of fluid flow states and components. These are also the greatest challenges faced by multiphase flowmeters, and currently there is no reliable technology available.

For the oil and gas testing measurement, especially during the initial stage where the pipeline pressure is high (usually reaching above 30 MPa), the flow rate is large, the flow state is complex, the fluid phase volume fraction and flow velocity are extremely unstable, and they are in a state of instantaneous change, which puts forward higher requirements for high-frequency, fast and accurate measurement of multiphase flowmeters.

Currently, the application of magnetic resonance multiphase flowmeters is concentrated in the production testing stage of oil and gas wells. During this stage, the phase volume fraction and flow rate do not undergo instantaneous changes, thus a measurement mode relying on a valve group for "static phase volume fraction+dynamic flow velocity" is adopted. This involves using the valve group to sample the produced fluids, enclosing a section of fluid within the magnetic resonance probe, and then conducting the static magnetic resonance spectrum analysis to obtain the phase volume fraction. Subsequently, the total flow velocity is measured under continuous flow conditions, ultimately yielding the oil, gas, and water flow rates. The problem of this "dynamic-static switching" measurement mode is the desynchronization between phase volume fraction measurement and flow velocity measurement. Specifically, the phase volume fraction is measured using a timed sampling method, and the flow velocity measurement is conducted after a period of phase volume fraction measurement. By this time, the phase volume fraction of the fluid may have already changed (this is particularly evident in gas wells). This measurement mode is suitable for production wells with relatively stable fluid production, but it is not suitable for the unstable fluid production conditions encountered during oil and gas testing. Furthermore, during the oil and gas testing stage, the pressure inside the pipeline is generally high, and the produced fluids often contain solid oil phases. Frequent opening and closing of valves can cause severe water hammer effects, while the valve components are also prone to erosion and wear, which in severe cases can lead to dangerous gas leaks.

To address the aforementioned problems, this invention proposes a magnetic resonance multiphase flow metering method and apparatus specifically designed for oil and gas testing. This allows the application of magnetic resonance technology to this unique scenario of oil and gas testing, enabling online metering and analysis of multiphase flows. Specifically, it utilizes magnetic resonance (MR) technology, a mainstream indoor fluid component analysis technique known for its non-intrusive, environmentally friendly, efficient, and accurate measurement methods. Currently, it has been applied in industrial settings for online measurement of complex mixed-phase fluids. The multiphase flow nuclear magnetic resonance flowmeter, developed against this backdrop, marks the first application of MR technology in the field of oil and gas metering.

FIG. 1 is a system structural diagram of a multiphase flow metering system according to one embodiment of the invention. As shown in FIG. 1, an embodiment of the invention provides a multiphase flow metering system including: a magnetic resonance multiphase flowmeter 1 and a manifold system, which is correspondingly configured; wherein, the manifold system includes a plurality of control valves and a connection pipeline and is configured to control a corresponding fluid to flow through the magnetic resonance multiphase flowmeter 1; the magnetic resonance multiphase flowmeter 1 includes a plurality of magnet structures, which are distributed at intervals in an axial direction of the magnetic resonance multiphase flowmeter 1 and are configured to magnetize a fluid; and the magnetic resonance multiphase flowmeter 1 further includes two measurement antennas, which are distributed at intervals in the axial direction of the magnetic resonance multiphase flowmeter 1 and are configured to perform phase state detection on the magnetized fluid.

Preferably, the manifold system includes: four three-way valves, one two-way valve 3 and one pressure-limiting safety valve 7; wherein the multiphase flow metering system includes: a measurement trunk and a measurement branch; wherein the measurement trunk is connected in sequence of a first three-way valve 2, a two-way valve 3, a magnetic resonance multiphase flowmeter 1, a second three-way valve 4 and a third three-way valve 5; the measurement branch includes a fourth three-way valve 6 and a pressure-limiting safety valve 7; the measurement branch is connected in parallel on the measurement branch through a third port of the first three-way valve 2, a third port of the second three-way valve 4 and a third port of the third three-way valve 5.

In the embodiment of the present invention, the conventional magnetic resonance multiphase flowmeter 1 has a risk of valve failure during oil and gas testing, which may result in poor or even clogged fluid flow in the pipeline, causing serious leakage accidents and the like. There is a need to design a branch-line structure that effectively copes with the problem of overpressure due to valve failure while not affecting normal production activities in the field, thus increasing the range of applicability of the flowmeter and reducing safety risks.

Preferably, the valve open and closed states of the plurality of valves of the manifold system are determined by the detected state of the fluid; wherein, if the fluid is detected to be in a flow state: the first three-way valve 2, the third three-way valve 5 and the fourth three-way valve 6 are in a three-way state; the second three-way valve 4 is in a horizontal two-way state; the two-way valve 3 is in an open state; the pressure-limiting safety valve 7 is in a closed state; if the fluid is detected to be in a static state: the first three-way valve 2, the third three-way valve 5 and the fourth three-way valve 6 are in a three-way state; the second three-way valve 4 is in a state that a liquid outlet end connected to the magnetic resonance multiphase flowmeter 1 is closed, and the remaining two ends are in an open state; and the two-way valve 3 is in a closed state; the pressure-limiting safety valve 7 is in a state to be activated; wherein an activation condition of the pressure-limiting safety valve 7 is that the pressure inside the connection pipeline is greater than a preset threshold value.

In the present embodiment, preferably, the first three-way valve 2, the third three-way valve 5 and the fourth three-way valve 6 are manual valves; the second three-way valve 4 is an electrically controlled valve; the two-way valve 3 is an electrically controlled valve. Then the present branch-line pipe structure includes three manual three-way valves, one three-way electric valve, one two-way electrically controlled valve, and one pressure-limiting safety valve 7. When the system performs flow measurement, the three manual valves are all in the three-way state, the electrically controlled three-way valve is open in the horizontal direction, and the two-way valve 3 is in the open state. The pressure inside the pipeline is lower than the set pressure of the pressure-limiting safety valve, the safety valve is in the closed state; the fluid can then flow through the multiphase flowmeter for flow measurement. When the system performs a static measurement, the three manual valves are all in the three-way state, the electrically controlled three-way valve is open in the vertical and right directions, and the two-way valve 3 is in the closed state. The pressure inside the pipeline is lower than the set pressure of the pressure-limiting safety valve, the safety valve is in the closed state; the fluid in the flowmeter is now in a static state, and the fluid flows through the branch of the manifold system.

When the two electrically controlled valves do not operate smoothly, or do not operate synchronously, and the pressure in the pipeline fluctuates or rises, the pressure is higher than the set pressure of the pressure-limiting safety valve, and the safety valve is automatically opened to release the pressure to the branch pipeline, so that the pressure in the pipeline can be controlled within a safe range.

When the system undergoes equipment maintenance, the third three-way valve 5 is open in the vertical and right directions, the fourth three-way valve 6 is open in the horizontal direction, and the first three-way valve 2 is open in the vertical and left directions. The safety valve automatically opens, and at this time, the fluid flows through the branch of the manifold system, allowing maintenance operations to be performed on the multiphase flowmeter, valves, and other equipment.

Figure 2:
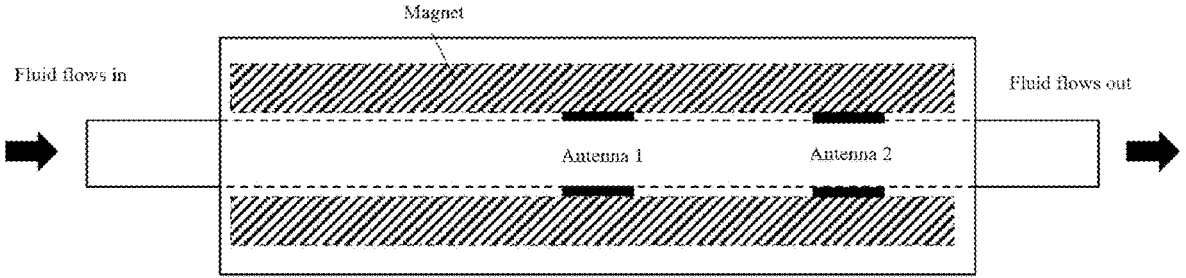
FIG. 2 is a schematic diagram of a structure of a magnetic resonance multiphase flowmeter according to an embodiment of the invention.

Preferably, as shown in FIG. 2, both measurement antennas are located in the axial second half of the magnetic resonance multiphase flowmeter 1 as the probing section of the magnetic resonance multiphase flowmeter 1; the first half of the magnetic resonance multiphase flowmeter 1 is the polarizing section.

Preferably, the plurality of magnet structures located at the polarizing section are closely arranged; the plurality of magnet structures located in the probing section are arranged at equal intervals; wherein the magnet structures are ring magnet structures or Halbach magnet structures.

In the embodiment of the invention, the fluid flow velocity is relatively fast in the oil and gas testing stage, and the time for the fluid to flow into the magnet until it reaches the antenna is relatively short, that is, the magnetization time is short and the magnetization efficiency is low, resulting in low amplitude of the collected signal and low signal-to-noise ratio, thus affecting the measurement accuracy. Therefore, it is necessary to improve the magnetization efficiency of the fluid. There are two methods here, one is to reduce the flow velocity, and the other is to increase the static magnetic field strength. The former can be realized by increasing the inner diameter of the pipeline, but there are many engineering problems. For example, during gas testing, the sudden change of the diameter of the pipeline will cause a large temperature change in the high-pressure gas, which will affect the measurement accuracy. At the same time, a larger pipeline means a larger magnet volume, the cost also increases. The latter needs to be realized by installing an over-polarized magnet section. The over-polarized magnet section used in the production of the magnetic resonance multiphase flowmeter 1 for measurement adopts a multi-ring magnet design, and a small magnet is placed on the outside of the existing magnet ring to improve the magnetic field strength, but this method has two display problems. One is that the volume of the magnet in the over-polarized section is expanded, and the overall volume of the probe is expanded. In addition, the size of the magnet in the over-polarized magnet section is different from that of the probing section, which requires separate mold opening and processing, and the cost is relatively high. In order to solve this problem, a new over-polarized magnet solution is proposed in this case. That is to say, the probe of magnetic resonance multiphase flowmeter for oil and gas testing adopts a multi-ring magnet structure, each ring magnet is the same, and the magnetization length of the fluid is extended by setting the distance between the rings. In this structure, there is no spacing between the magnet rings in the pre-polarizing section, so that the magnetic field strength is improved, while the spacing is reserved in the probing section. Because all the magnet rings are completely consistent, the processing cost is low, and the adjustable space in the later stage is large. The magnet ring can adopt the structure of a ring magnet or a Halbach magnet, which does not affect the implementation of the present case.

FIG. 3 is a flowchart of the steps of a multiphase flow metering method according to an embodiment of the present invention. As shown in FIG. 3, an embodiment of the present invention provides a multiphase flow metering method, the method including:

Step S10: according to a selected measurement requirement and by using a corresponding measurement method, a phase state parameter of a fluid is measured.

Specifically, this invention is used in the field of oil and gas testing, where the main detection involves two phase states: the liquid phase and the gas phase. Different detection methods are preset to correspond to different detection requirements. The two most core detection requirements are fluid water cut detection and gas phase measurement methods. These methods correspond to the characteristics of oil and gas reservoirs, verify the correctness of reservoir understanding and interpretation, evaluate the development value of oil reservoirs, and determine the mining work system. For example, if water cut detection is needed in the liquid to be subjected to measurement, the corresponding water cut detection button will be triggered. If there are both measurement requirements, water cut and gas phase measurements will be conducted one by one according to the measurement requirements.

Step S20: reflected signals of the fluid are simultaneously collected by means of two measurement antennas.

Specifically, different detection methods are executed in response to different detection requirements. For the water cut measurement, first, two antennas simultaneously emit CPMG pulse sequences and collect echo trains. Preferably, the echo spacing used in this step should be as small as possible, preferably 200 microseconds. Each pulse generates an echo, and echo train corresponding to each measurement antenna are obtained based on the pulse sequence. Then, based on the time sequence, the two echo trains are fitted to obtain two corresponding fitted curves. Since gas-phase signals and solid-phase signals decay rapidly within a very short period, the remaining signals all come from the liquid phase. Therefore, when collecting the liquid-phase water cut, it is necessary to ensure that the signals are all derived from the liquid phase. This means that the amplitude after a preset time should be selected as the judgment signal. The preset time should be long enough to ensure that both gas-phase and solid-phase signals have decayed. Therefore, this signal should be greater than 1 ms. Preferably, the amplitudes of the two fitted curves at 1 ms are directly obtained, and the water cut and oil cut are calculated based on the ratio of these two amplitudes. According to the principles of nuclear magnetic resonance, we know that when studying H nuclei, the content of H protons in a sample is directly proportional to the signal quantity. Macroscopically, for the same type of sample, the more mass it has, the stronger the signal will be. This is the basis for our quantitative research. Before the experiment, we only need to prepare some standard samples with known contents to obtain the linear relationship between their contents and signal quantities. When dealing with similar unknown samples, we can measure their signal quantities under the same parameters and accurately and quickly obtain their contents using the corresponding relationship from the standard curve. Correspondingly, based on the research rules of H nuclei, we cannot directly obtain the number of H protons in oil and gas. However, the quantity of water and oil in the fluid to be subjected to measurement can be calculated through water cut and oil cut measurements.

For the gas-phase measurement method, since the signal decays rapidly, it cannot be measured using the water cut measurement method. Therefore, it is necessary to pre-set the scale of the apparatus. The preset apparatus scale includes: a hydrogen index scale of oil, a hydrogen index scale of natural gas, a length scale of two measurement antennas, an effective area length scale of magnet structures on front ends of the two measurement antennas. The preset scale can be used as a standard rule, and gas-phase measurements can be conducted based on this standard rule.

When the hydrogen index scale of the oil is preset, the fluid sample to be detected is taken on site, and then the respective echo train first amplitudes $M(0)_{oil}$ and $M(0)_{water}$ are measured using the on-site oil sample and pure water sample of the same size, and the hydrogen index $HI_{oil}$ of the oil is obtained according to the obtained amplitudes, which is calculated as:

$$HI_{oil} = \frac{M(0)_{oil}}{M(0)_{water}}$$

When presetting the hydrogen index scale of the natural gas, there are various methods, including:

1) A sample of the fluid to be detected is collected on site. Then, the oil sample and pure water sample of the same size on site are used to measure the echo train first amplitudes $M(0)_{oil}$ and $M(0)_{water}$, respectively. Similar to the method for presetting the hydrogen index scale of the oil, the corresponding hydrogen index for the natural gas can be obtained. Since gases are greatly influenced by temperature and pressure, the temperature and pressure parameters are adjusted within the preset range, and the hydrogen index of the natural gas under each temperature and pressure condition is obtained separately.

2) Direct calibration on site: full-pipe gas is applied on site, and the valve is switched to a static state. Temperature and pressure data are read, and the first amplitude is measured. At the same time, the first amplitude of full-pipe water is also measured, and the hydrogen index $HI_{gas}$ of the natural gas under the current pressure is calibrated.

3) Direct calibration on site: for calibration of production wells on site (with relatively fixed ratios of oil, gas, and water), the valve is switched to a static state, and temperature and pressure data are read. The T2 spectrum is measured to identify the gas peak, and the first amplitude of the echo train is obtained through forward modeling. Combined with the gas cut provided by the oilfield, the hydrogen index $HI_{gas}$ of the natural gas can be derived.

When presetting the length scale of the two measurement antennas, water with a known fixed flow velocity is applied. An approximate antenna length is set on a spectrometer software interface. Preferably, the nuclear magnetic flow velocity is calculated based on the decay rate of the first 50 ms of the echo train collected through the CPMG pulse sequence. By adjusting the set antenna length data, when the measured flow velocity matches the actual flow velocity, the set antenna length data represents the actual effective length of the antenna.

When presetting the effective region length scale of the magnetic structures on the front ends of the two measurement antennas, water with a fixed flow velocity is applied. The first amplitudes $M(t)_A$ and $M(t')_B$ of the echo trains from the two antennas are collected separately using the Flow mode of the spectrometer. Then, the valve is closed and the power to the valve is cut off. The first amplitudes $M(0)_A$ and $M(0)_B$ of the echo trains from the two antennas are collected again using the Flow mode. The preset relationship is used to determine the time taken for the fluid to be magnetized after entering the magnet and flow into the two antennas. The preset relationship is as follows:

$$M(t) = M(0) * \left(1 - \exp\left(\frac{-t}{T1_{water}}\right)\right)$$

By combining the given flow velocity, the effective region length scale of the magnetic structures on the front ends of the two measurement antennas can be calculated.

After completing the scale presetting, the gas cut measurement can be carried out. Firstly, since the fluid pipe contains only the liquid phase and the natural gas, the following equation always holds true:

$$R_{gas} + R_{liquid} = 1$$

Wherein, $R_{liquid} = R_{water} + R_{oil}$, is the content ratio of the liquid phase; $R_{gas}$ is the gas phase content ratio. At this point, the first amplitude of the multiphase flow signal collected by the primary antenna is $M_{mix}$, which is expressed as:

$$M_{mix} = R_{gas} * M_{gas} + R_{liquid} * M_{liquid}$$

Wherein, $M_{mix}$ is the measured first amplitude of the multiphase flow signal; $M_{gas}$ is the first amplitude of the multiphase flow signal marked by the hydrogen index scale of the natural gas; $M_{liquid}$ is the first amplitude of the signal when the connection pipeline is filled with the liquid-phase fluid of the current oil-water ratio. Its expression is:

$$M_{liquid} = R_{water} * M_{water} + R_{oil} * M_{oil} =$$

$$R_{water} * M_{water} + (1 - R_{water}) * M_{water} * HI_{oil}$$

$M_{water}$ and $M_{oil}$ represent the first amplitudes of the echo train signals when the pipe is filled with the water and oil, respectively. Based on the above conversion relationship, the gas phase content ratio can be obtained. However, the gas phase content ratio obtained here is the gas volume fraction under working conditions, and it needs to be converted to the gas volume fraction under standard conditions based on the temperature, pressure, and gas composition within the pipe.

In one embodiment, the method also includes a flow velocity measurement method. During the oil and gas testing stage, the fluid flow rate is relatively high and the flow velocity is fast, and a higher measurement frequency is required due to the complex flow state. However, magnetic resonance signals are extremely weak (nV level) and can easily be overwhelmed by electronic noise. Therefore, magnetic resonance measurements often require repeated measurements of signals and accumulation to obtain a higher signal-to-noise ratio. But multiple accumulation tests imply longer single measurement time, which is obviously contradictory. Therefore, this invention proposes a flow velocity measurement method based on single accumulation of dual-antenna signals. Firstly, the two measurement antennas simultaneously emit CPMG pulse sequences and collect echo trains. The echo trains of the two measurement antennas are fitted separately to obtain two fitted curves. The amplitudes of the two fitted curves at preset moments are extracted, and the water cut and oil cut of the current fluid are obtained based on the amplitude ratio of the two fitted curves at the same moment.

Step S30: the phase state parameter of the fluid is read according to the collected reflected signals and a preset apparatus scale.

Specifically, according to the detection methods of different detection requirements mentioned in step S20, the detection signals corresponding to the requirements are collected, and the detection results of the requirements are output according to the corresponding detection signals, so as to realize the idea of carrying out oil and gas testing detection by the nuclear magnetic resonance technology.

Embodiments of the present invention also provide a computer-readable storage medium having stored thereon instructions that when run on a computer cause the computer to perform the multiphase flow metering method described above.

Those skilled in the art will appreciate that all or part of the steps in the method of implementing the above embodiments can be performed by instructing the relevant hardware through a program stored in a storage medium, including a number of instructions to cause a single chip, chip or processor to perform all or part of the steps of the method according to various embodiments of the present invention. The aforementioned storage medium includes various media that can store program codes, such as a U disk, a mobile hard disk, a Read-Only Memory (ROM), a Random Access Memory (RAM), a magnetic disk, or an optical disk.

The above-described alternative embodiments of the present invention are described in detail in conjunction with the accompanying drawings. However, the embodiments of the present invention are not limited to the specific details of the above-mentioned embodiments. Within the technical conception scope of the embodiments of the present invention, a variety of simple variants of the technical solutions of the embodiments of the present invention can be carried out, and these simple variants fall within the protection scope of the embodiments of the present invention. It should also be noted that each of the specific technical features described in the above-described specific embodiments may be combined in any suitable manner without being contradictory. In order to avoid unnecessary duplication, the embodiments of the present invention do not separately describe various possible combinations.

In addition, any combination between various embodiments of the present invention can also be carried out, and as long as it does not violate the idea of the embodiments of the present invention, it should also be regarded as the content disclosed in the embodiments of the present invention.

The invention claimed is:

1. A multiphase flow metering system, wherein the multiphase flow metering system comprises: a magnetic resonance multiphase flowmeter and a manifold system, which is correspondingly configured;

the manifold system comprises a plurality of control valves and a connection pipeline and is configured to control a corresponding fluid to flow through the magnetic resonance multiphase flowmeter;

the manifold system comprises:

a measurement trunk and a measurement branch;

the measurement trunk is formed by connecting the following components in sequence: a first three-way valve (2), a two-way valve (3), a second three-way valve (4) and a third three-way valve (5); and the magnetic resonance multiphase flowmeter (1) is disposed between the two-way valve (3) and the second three-way valve (4);

the measurement branch comprises:

a fourth three-way valve (6) and a pressure-limiting safety valve (7); and the measurement branch is connected in parallel on the measurement trunk through a third port of the first three-way valve (2), a third port of the second three-way valve (4) and a third port of the third three-way valve (5);

the magnetic resonance multiphase flowmeter comprises a plurality of magnet structures, which are distributed at intervals in an axial direction of the magnetic resonance multiphase flowmeter and are configured to magnetize a fluid; and the magnetic resonance multiphase flowmeter further comprises two measurement antennas, which are distributed at intervals in the axial direction of the magnetic resonance multiphase flowmeter and are configured to perform phase state detection on the magnetized fluid.

2. The system according to claim 1, wherein an opening and closing states of the first three-way valve (2), the second three-way valve (4), the third three-way valve (5), and the fourth three-way valve (6) are determined by the detection state of the fluid; wherein, if the fluid is detected to be in a flow state: the first three-way valve (2), the third three-way valve (5) and the fourth three-way valve (6) are in a three-way state; the second three-way valve (4) is in a horizontal two-way state; the two-way valve (3) is in an open state; the pressure-limiting safety valve (7) is in a closed state;

if the fluid is detected to be in a static state: the first three-way valve (2), the third three-way valve (5) and the fourth three-way valve (6) are in a three-way state; the second three-way valve (4) is in a state that a liquid outlet end connected to the magnetic resonance multiphase flowmeter (1) is closed, and the remaining two ends are in an open state; and the two-way valve (3) is in a closed state; the pressure-limiting safety valve (7) is in a state to be activated; wherein an activation condition of the pressure-limiting safety valve (7) is that the pressure inside the connection pipeline is greater than a preset threshold value.

3. The system according to claim 1, wherein a rear half in the axial direction of the magnetic resonance multiphase flowmeter (1) is used as a probing section and a front half in the axial direction of the magnetic resonance multiphase flowmeter (1) is used as a polarizing section; and the multiphase flow metering system further comprises: two measurement antennas;

both measurement antennas are located in the probing section of the magnetic resonance multiphase flowmeter (1).

4. The system according to claim 3, wherein the magnet structures are ring magnet structures or Halbach magnet structures;

the magnet structures located in the polarizing section of the magnetic resonance multiphase flowmeter (1) are arranged in contact connection; and the magnet structures located in the probing section of the magnetic resonance multiphase flowmeter (1) are arranged at equal intervals.

5. A multiphase flow metering method, wherein the method is implemented based on the multiphase flow metering system according to claim 1, the method comprising:

according to a selected measurement requirement and by using a corresponding measurement method, measuring a phase state parameter of a fluid; wherein the phase state parameter is a content or speed parameter of a target phase state;

simultaneously collecting reflected signals of the fluid by means of two measurement antennas; and reading the phase state parameter of the fluid according to the collected reflected signals and a preset apparatus scale.

6. The method according to claim 5, wherein the measurement method comprises:

a water cut measurement method, a gas phase measurement method and a flow velocity measurement method.

7. The method according to claim 6, wherein the water cut measurement method comprises:

collecting echo trains of Carr-Purcell-Meiboom-Gill (CPMG) pulse sequences transmitted by the two measurement antennas at the same time;

respectively fitting the echo trains of the two measurement antennas to obtain corresponding fitted curves;

respectively extracting magnitudes of the two fitted curves at a preset moment; and according to a ratio of the magnitudes of the two fitted curves at the same moment, obtaining the water cut and oil cut of the current fluid.

8. The method according to claim 6, wherein the preset apparatus scale comprises:

a hydrogen index scale of oil, a hydrogen index scale of natural gas, a length scale of the two measurement antennas, an effective area length scale of magnet structures on front ends of the two measurement antennas.

9. The method according to claim 8, wherein the method further comprises:

constructing a preset apparatus scale, comprising constructing a hydrogen index of oil and constructing a hydrogen index scale of natural gas; wherein, the constructing the hydrogen index of the oil, comprising:

collecting a fluid sample, obtaining the water cut and oil cut of the fluid sample, obtaining a hydrogen index scale for oil of the fluid sample from the water cut and the oil cut of the fluid sample; and the constructing the hydrogen index scale of the natural gas, comprising: measuring the water cut and the oil cut of the fluid sample at different temperature pressures, obtaining the hydrogen index scale of the natural gas of the sample to be subjected to measurement according to the water cut and the oil cut of the fluid sample at different temperature pressures; or filling the magnetic resonance multiphase flowmeter (1) with a fluid sample and water respectively, obtaining a measured first amplitude of the fluid sample and a measured first amplitude of the water under a condition that the fluid is in a static state, and obtaining a hydrogen index scale of the natural gas based on a ratio of the two.

10. The method according to claim 9, wherein the gas phase measurement method comprises:

acquiring a first amplitude of a multiphase flow signal collected by any one of the measurement antennas;

obtaining a gas phase content ratio according to the first amplitude of the multiphase flow signal and a preset conversion relationship of a first amplitude of the signal to the gas phase content ratio, the conversion relationship being:

$$R_{gas} + R_{liquid} = 1$$

$$M_{mix} = R_{gas} * M_{gas} + R_{liquid} * M_{liquid}$$

$$M_{liquid} = R_{water} * M_{water} + R_{oil} * M_{oil} =$$

$$R_{water} * M_{water} + (1 - R_{water}) * M_{water} * \text{HI}_{oil}$$

wherein, $M_{mix}$ is the measured first amplitude of a multiphase flow signal;

$R_{gas}$ is the gas phase content ratio;

$M_{gas}$ is the first amplitude of the multiphase flow signal marked by the hydrogen index scale of the natural gas;

$R_{liquid}$=$R_{water}$+$R_{oil}$, is a content ratio of a liquid phase;

$M_{liquid}$ is the first amplitude of the signal when the connection pipeline is filled with a liquid-phase fluid of a current oil-water ratio;

$M_{water}$ is the first amplitude of the signal when the connection pipeline is filled with the oil;

$\text{HI}_{oil}$ is the hydrogen index scale of the oil; and obtaining a gas volume fraction at a standard operating condition according to the gas phase content ratio, and taking an obtained gas volume fraction as a gas phase measurement result.

11. The method according to claim 6, prior to performing a flow rate measurement method, the method further comprises:

performing superposition of echo train data measured by two measurement antennas, comprising:

extracting the echo train data measured by the two measurement antennas, wherein the Carr-Purcell- Meiboom-Gill (CPMG) pulse sequences applied by the two measurement antennas are identical in number of pulses and echo spacing, and a phase difference being 180°; and multiplying all the echo train data of one of the measurement antennas by a wavenumber of the echo to obtain processed echo train data for the measurement antenna, accumulating the processed echo train data for the measurement antenna with the echo train data for the other measurement antenna, and performing a flow rate measurement of the fluid based on the accumulated echo train data.

12. A non-transitory computer-readable storage medium having stored thereon instructions which, when run on a computer, cause the computer to perform the multiphase flow metering method according to claim 5.

\* \* \* \* \*